(12) United States Patent
Iwasawa

(10) Patent No.: US 9,140,793 B2
(45) Date of Patent: Sep. 22, 2015

(54) LASER SCAN SENSOR

(75) Inventor: Masashi Iwasawa, Otsu (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/128,143

(22) PCT Filed: Sep. 12, 2012

(86) PCT No.: PCT/JP2012/073261
§ 371 (c)(1),
(2), (4) Date: Dec. 20, 2013

(87) PCT Pub. No.: WO2013/039085
PCT Pub. Date: Mar. 21, 2013

(65) Prior Publication Data
US 2014/0139819 A1    May 22, 2014

(30) Foreign Application Priority Data

Sep. 12, 2011 (JP) ................................. 2011-198707

(51) Int. Cl.
*G01S 17/02* (2006.01)
*G01S 17/42* (2006.01)
*G01S 17/88* (2006.01)
*G01S 7/48* (2006.01)
(Continued)

(52) U.S. Cl.
CPC ............. *G01S 17/026* (2013.01); *G01S 7/4802* (2013.01); *G01S 17/42* (2013.01); *G01S 17/88* (2013.01); *G08B 13/183* (2013.01); *G08B 13/187* (2013.01)

(58) Field of Classification Search
CPC ....................................................... G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS 7,940,178 B2    5/2011    Iwasawa
2009/0091447 A1    4/2009    Iwasawa
(Continued)

FOREIGN PATENT DOCUMENTS

EP    2 048 517    4/2009
JP    3011121    2/2000
(Continued)

OTHER PUBLICATIONS

International Search Report issued Nov. 27, 2012 in International (PCT) Application No. PCT/JP2012/073261.

*Primary Examiner* — Luke Ratcliffe
(74) *Attorney, Agent, or Firm* — Wenderoth, Lind & Ponack, L.L.P.

(57) ABSTRACT

The configuration includes a laser range finder (110), a scan mechanism (120), a distance-data acquiring unit (130), a memory (160), a human-body determining unit (140), which detects an object with possibility to correspond to a human body from acquired distance information, calculates a height and a width of the object based on installation state information stored in the memory (160), determines that the object is a human body when detection of the object continues for a first predetermined time or longer in the case where a calculated object height is a predetermined height or more, and determines that the object is a human body when detection of the object continues for a second predetermined time longer than the first predetermined time or longer in the case where the calculated object height is less than the predetermined height, and an alert-output control unit (150).

6 Claims, 6 Drawing Sheets

(51) Int. Cl.
   *G08B 13/183* (2006.01)
   *G08B 13/187* (2006.01)

(56) References Cited

U.S. PATENT DOCUMENTS

2009/0108184 A1   4/2009   Iwasawa
2011/0274250 A1*  11/2011  Gray et al. ............... 378/87
2013/0094705 A1*  4/2013   Tyagi et al. ............... 382/103

FOREIGN PATENT DOCUMENTS

| JP | 2004-185363 | 7/2004 |
| JP | 2006-243946 | 9/2006 |
| JP | 2009-093428 | 4/2009 |
| JP | 2009-110124 | 5/2009 |

* cited by examiner (a)

(b)

LASER SCAN SENSOR

TECHNICAL FIELD

The present invention relates to a laser scan sensor that detects, for example, an intruder into the building premises, in particular, relates to a laser scan sensor that can detect and distinguish between a small animal and and an intruder in a crawling posture in the case where the laser scan sensor is installed in a vertical or obliquely downward direction.

BACKGROUND ART

Conventionally, a "security system" for detecting an intruder using a laser range finder that employs a laser beam as a light source has been proposed (for example, see Patent Literature 1).

This "security system" includes a sensor unit, a swivel camera unit, and a control unit. The sensor unit sets a monitoring area at a scan angle for two-dimensionally scanning a light of an optical range finder. When the sensor unit detects an intruder within the area, the sensor unit outputs distance data and angle data of the intruder. The swivel camera unit is installed on an electrically-operated swivel base, and turns in conjunction with the sensor unit. The control unit has a function of: detecting the presence of an intruder by continuously detecting change in the distance data or the angle data several times at the sensor unit; calculating the position of the intruder using the changed distance data and angle data from the sensor unit; turning the swivel camera unit on the electrically-operated swivel base in accordance with the positional data; and displaying image data of the intruder on a monitor.

An "object identifying method using an area sensor" has also been proposed (for example, see Patent Literature 2) although this method is slightly different from a crime prevention apparatus and a security system. This method can accurately identify a pedestrian or the like using a laser beam.

According to this "object identifying method using the area sensor", an area sensor using a laser detector scans while projecting a pulse laser beam within a detection range that covers a walking area to which the pedestrian is guided and a peripheral area of the walking area, so as to measure a reflection time of the light. This method obtains the difference between a reflection time when an object is not present and a reflection time when an object is present for each scanning point to perform calculation of the shape and the size of the object and the vector based on positional change of the object for each scanning. Based on this operation signal, the method identifies an object that moves in the walking area along a guiding direction and an object that moves in a direction across the walking area.

Furthermore, in view of problems in these conventional techniques, the inventors of this application have already proposed a laser area sensor that does not only facilitate setting an appropriate security zone for preventing false detection as much as possible corresponding to the actual installation site, the security purpose, or the like, but also facilitates setting any security zone (see Patent Literature 3).

This "laser area sensor" includes a laser range_finder, a scanning mechanism unit, a distance-information acquiring unit, a human-body determining unit, and a human body-detection signal output unit. The laser range_finder uses a time after a laser beam emits before a reflected light returns from an object present in a direction of the emission so as to measure the distance to the object. The scanning mechanism unit changes the measurement direction of this laser range finder. The distance-information acquiring unit periodically performs measurement using the laser range finder while changing the measurement direction using this scanning mechanism unit, so as to form a detection area and to acquire distance information for each direction within the detection area in chronological order. The human-body determining unit extracts a portion estimated to correspond to a human body from the distance information acquired by this distance-information acquiring unit, and then determines whether or not the object is a human body based on a movement state of the extracted portion in chronological order. The human body-detection signal output unit outputs a human body detection signal in the case where this human-body determining unit determines that a human body is present.

CITATION LIST

Patent Literature

Patent Literature 1: Japanese Patent No. 3011121
Patent Literature 2: Japanese Unexamined Patent Application Publication No. 2004-185363
Patent Literature 3: Japanese Unexamined Patent Application Publication No. 2009-093428

SUMMARY OF INVENTION

Technical Problem

For example, the conventional technique disclosed in Patent Literature 3 extracts the portion estimated to correspond to the human body based on the height, the width, or similar parameter of the detected object in the acquired distance information. Subsequently, the conventional technique makes determination to confirm whether or not the detected object is an actual human body based on the detection duration, the movement state, and similar parameter in chronological order regarding the extracted portion.

In this determination, various parameters such as detection height and width are preliminarily set by, for example, a DIP switch or an external personal computer. Therefore, the used detection parameters of the human body in the determination process are fixed values.

Here, in the case where there is no difference in recognition time of the detected object between a small animal or the like, which is detected in a position comparatively close to the ground (low position), and a person, which is detected in a position comparatively high above (distant from) the ground while walking in an ordinary posture, both the objects are detected as a human body.

Erroneous detection of a small animal or the like has been solved by setting, for example, the parameters such that an object at a height up to a certain height with respect to the ground is not detected.

However, this no-detection setting for the certain height or less causes a non-detection state even in the case of, for example, a crawling invasion by a malicious person. That is, in the no-detection setting for the certain height or less, it has been difficult to configure the setting for ensuring the compatibility between prevention of the false detection of a small animal or the like and reliable detection of a person that invades by crawling or similar method.

The present invention has been made in view of the above-described problems of the conventional techniques, and it is an object of the present invention to provide a laser scan sensor that keeps the detection performance with respect to a person in an ordinary posture and further ensures the compatibility between prevention of false detection of a small animal or the like and reliable detection of a person that invades by crawling or similar method.

Solutions to the Problems

In order to achieve the above object, a laser scan sensor of the present invention includes a laser range finder, a scanning mechanism unit, a distance-information acquiring unit, a storage unit, a determining unit, and an alert-signal output unit. The laser range finder configured to measure a distance to an object based on a time after a laser beam emits before a reflected light returns from the object present in a direction of the emission. The scanning mechanism unit configured to change a measurement direction of the laser range finder. The distance-information acquiring unit is configured to periodically perform measurement using the laser range finder while changing the measurement direction using the scanning mechanism unit, so as to form a detection area and acquire distance information for each direction within the detection area in chronological order. The storage unit is configured to store installation state information of the laser range finder. The determining unit is configured to: detect an object with a possibility to correspond to a human body from the distance information acquired by the distance-information acquiring unit; calculate a height and a width of the object based on the installation state information stored in the storage unit; determine that the object is a human body when detection of the object continues for a first predetermined time or longer in a case where the calculated object height is equal to or more than a predetermined height; and determine that the object is a human body when detection of the object continues for a second predetermined time or longer in a case where the calculated object height is less than the predetermined height. The second predetermined time is longer than the first predetermined time. The alert-signal output unit is configured to output an alert signal in a case where the determining unit determines that a human body is present.

Here, the installation state information stored in the storage unit employs, for example, an installation height and a measurement direction of the laser range finder. However, the installation state information is not limited to these, and may include other information. Additionally, the laser scan sensor may further include a setting changing unit configured to change at least setting of the first predetermined time by external operation.

The laser scan sensor with this configuration keeps the detection performance with respect to the person in the ordinary posture at the same level of the conventional techniques. Additionally, in the case where the height of the detected object is low and there is a high possibility that the detected object is not a human body while walking ordinarily or standing, this configuration further takes into consideration the width of the detected object so as to appropriately set each time before the determination that the detected object is a human body is confirmed. This ensures the compatibility between prevention of false detection of a small animal or the like and reliable detection of the person that invade by, for example, crawling, thus allowing appropriate operation that does not cause false alarm or alarm failure as much as possible.

In the laser scan sensor of the present invention, the determining unit is configured to determine that the object is a human body when detection of the object continues for a third predetermined time or longer even in a case where the calculated object height is less than the predetermined height and the object width is equal to or more than a predetermined width. The third predetermined time is equal to or shorter than the first predetermined time.

The laser scan sensor with this configuration can detect and distinguish between the intruder crawling forward or similar way and the intruder rolling in a lying posture, appropriately.

Advantageous Effects of Invention

The laser scan sensor of the present invention keeps the detection performance with respect to the person in the ordinary posture at the same level of the conventional techniques and also ensures the compatibility between prevention of false detection of a small animal or the like and reliable detection of the person that invades by, for example, crawling, thus allowing appropriate operation that does not cause false alarm or alarm failure as much as possible.

BRIEF DESCRIPTION OF THE DRAWINGS

FIG. 4(a) is a schematic perspective view, and FIG. 4(b) is a schematic plan view.

FIG. 5(a) is a schematic perspective view, and FIG. 5(b) is a schematic plan view.

DESCRIPTION OF EMBODIMENTS

Figure 1:
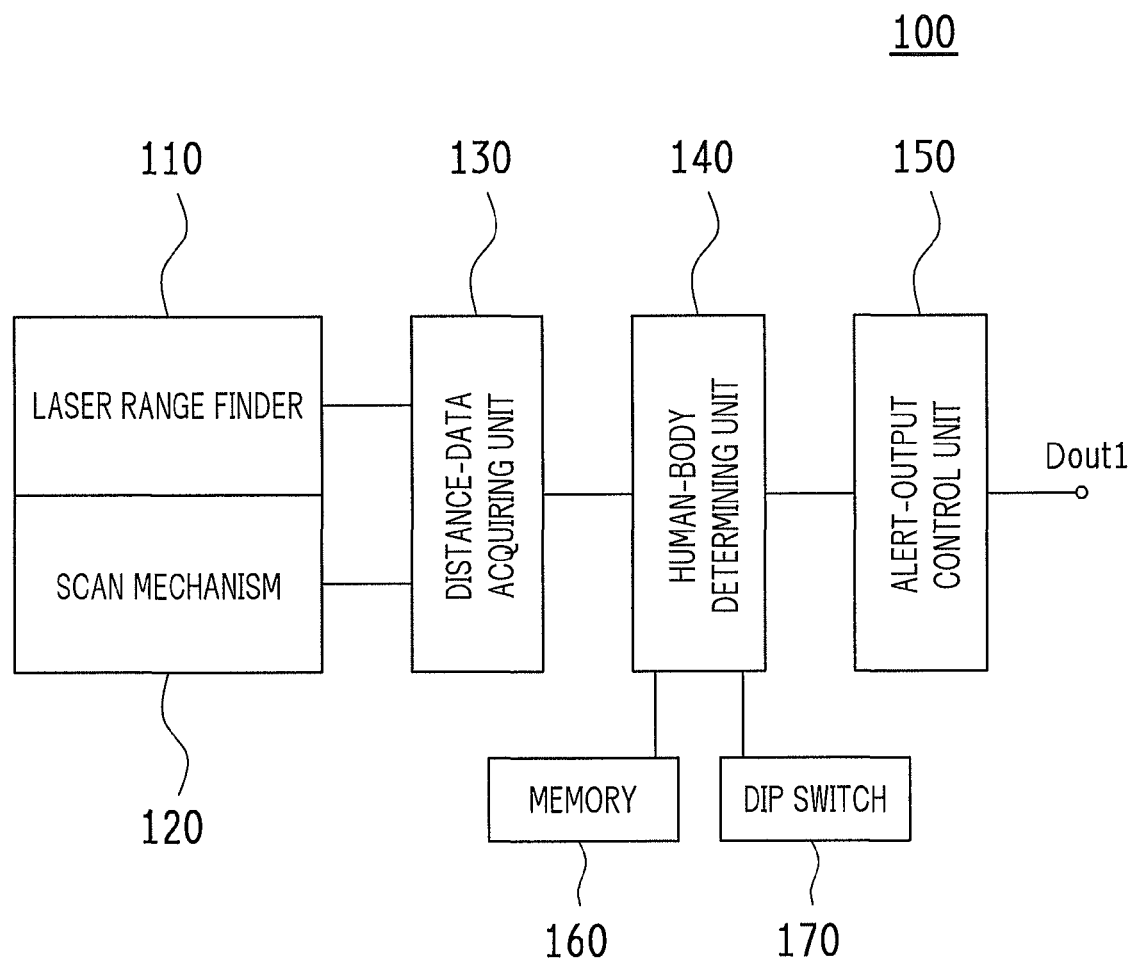
FIG. 1 is a block diagram illustrating a schematic configuration of a laser scan sensor 100 according to one embodiment of the present invention.

Hereinafter, a description will be given of an embodiment of the present invention by referring to the drawings.

Schematic Configuration of Embodiment

Figure 2:
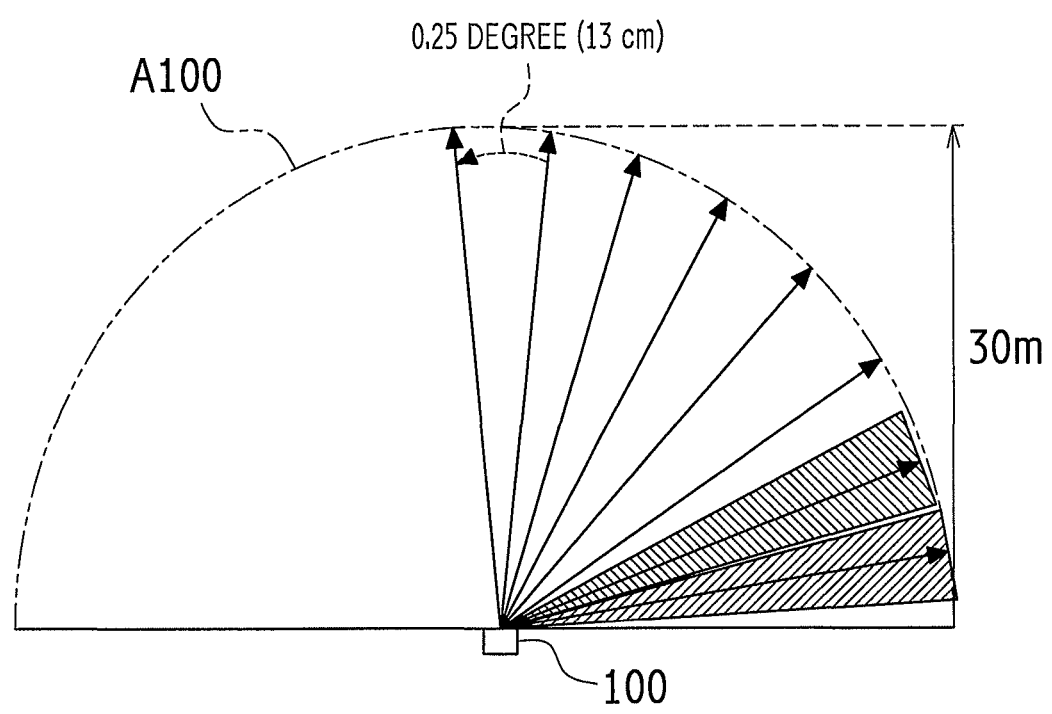
FIG. 2 is a schematic plan view illustrating a detection area formed by the laser scan sensor 100.
Figure 3:
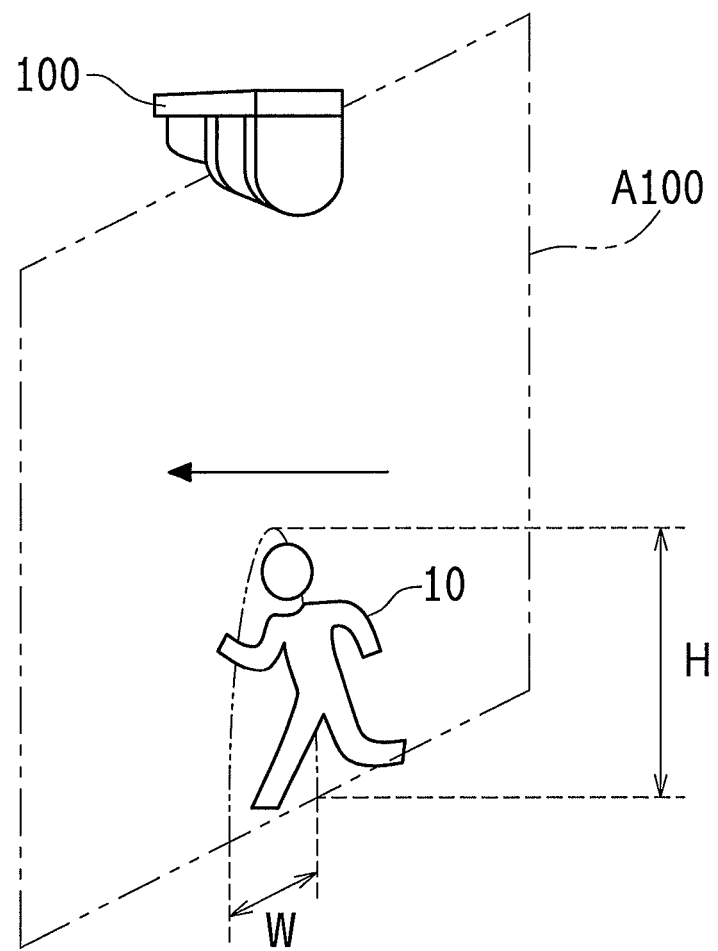
FIG. 3 is a schematic perspective view illustrating an example where an ordinarily walking person 10 invades.
Figure 4:
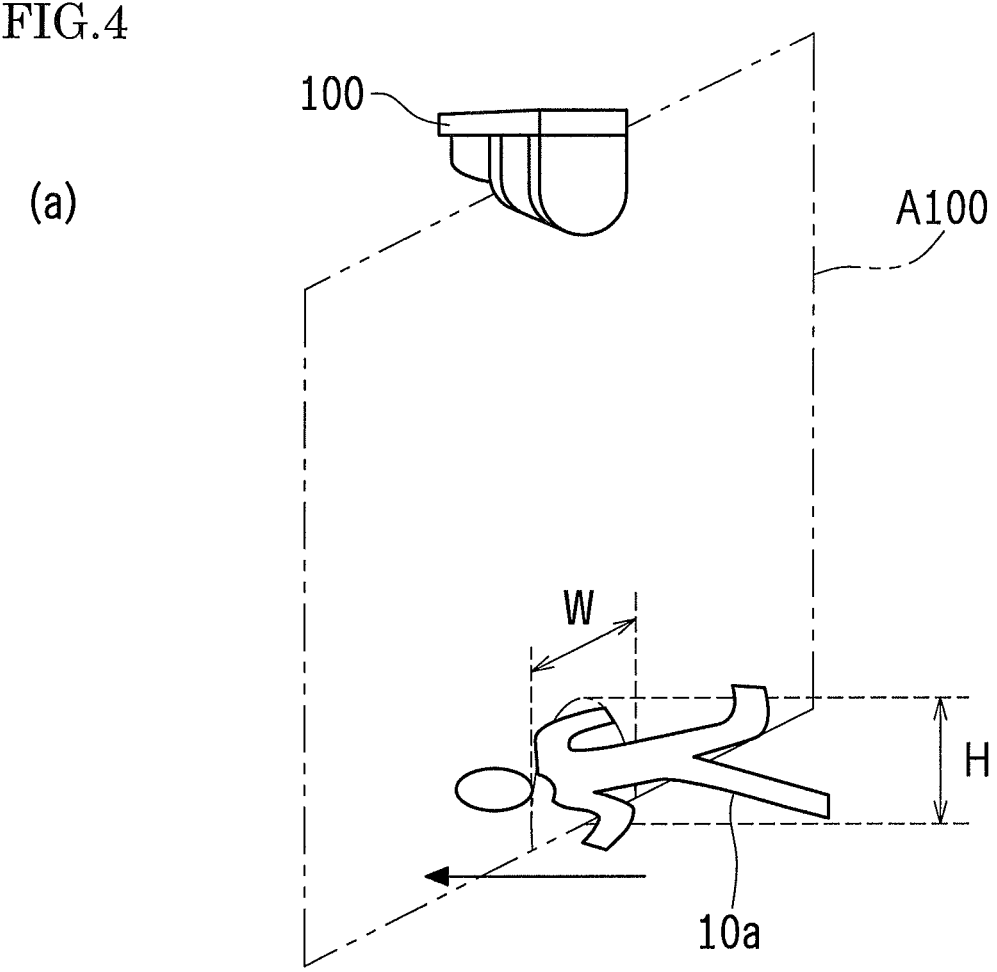
FIG. 4(a) and FIG. 4(b) illustrate an example of a malicious person 10a invading by crawling forward.
Figure 4:
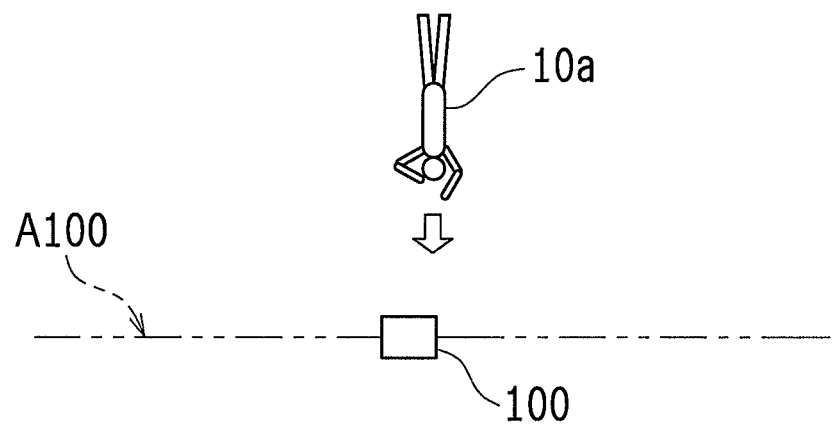
Figure 5:
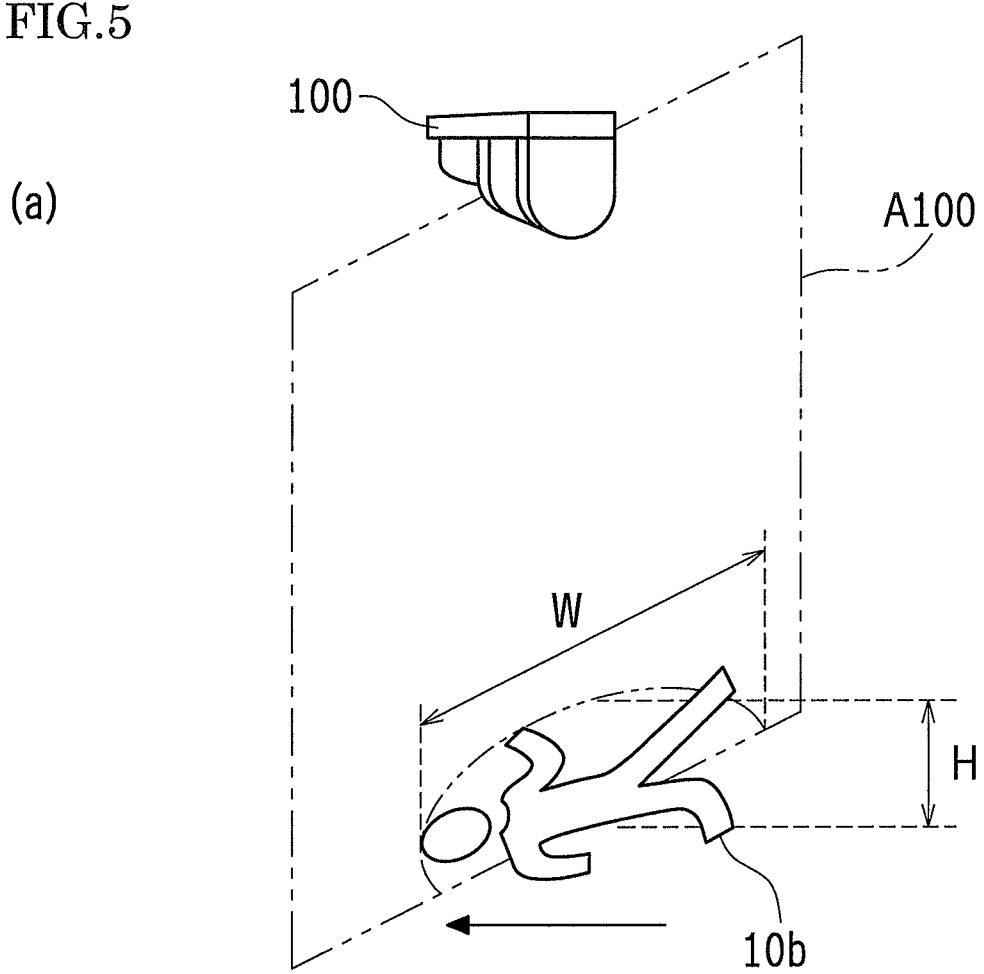
FIG. 5(a) and FIG. 5(b) illustrate an example of a malicious person 10b invading by rolling in a lying posture.
Figure 5:
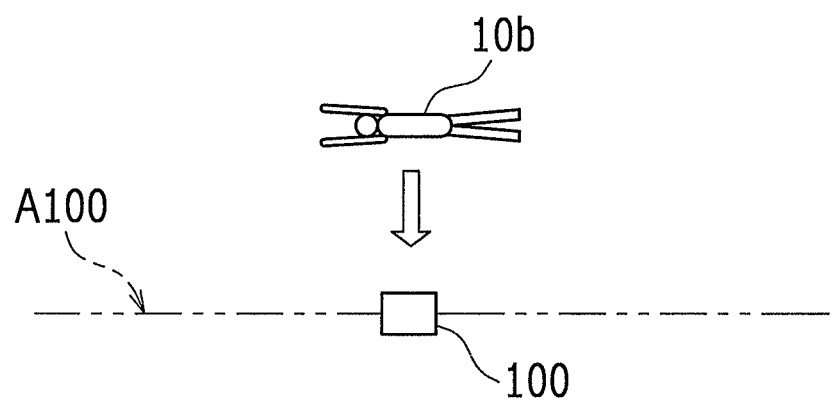

FIG. 1 is a block diagram illustrating a schematic configuration of a laser scan sensor 100 according to one embodiment of the present invention. FIG. 2 is a schematic plan view illustrating a detection area formed by this laser scan sensor 100. Here, in FIG. 2, intervals between adjacent distance measurement directions are illustrated much larger than actual intervals for convenience of explanation. FIG. 3 is a schematic perspective view illustrating an example where an ordinarily walking person 10 invades. FIG. 4(a) and FIG. 4(b) illustrate an example of the malicious person 10a invading by crawling forward, FIG. 4(a) is a schematic perspective view, and FIG. 4(b) is a schematic plan view. FIG. 5(a) and FIG. 5(b) illustrate an example of the malicious person 10b invading by rolling in a lying posture, FIG. 5(a) is a schematic perspective view, and FIG. 5(b) is a schematic plan view.

As illustrated in FIG. 1, the laser scan sensor 100 includes a laser range finder 110, a scan mechanism 120, a distance-data acquiring unit 130, a human-body determining unit 140, an alert-output control unit 150, a memory 160, and a DIP switch 170.

The laser range finder 110 emits a pulse laser beam and precisely measures an infinitesimal time until a reflected light returns from an object present in a direction of the emission, so as to accurately measure the distance to the object. In the laser range finder 110, a light emitting element of a laser beam can employ, for example, a semiconductor laser diode (LD). A light receiving element can employ, for example, an avalanche photodiode (APD). Disposing a dedicated hardware circuit or the like is preferred, for example, for controlling the drive of the light emitting element or for measuring the time before the reflected light returns. As a general feature, the laser range finder can measure a precise distance up to a considerably long distance. For example, the laser range finder can measure several tens of meters at maximum, in some cases, can measure even a much longer distance. However, the laser range finder 110 employs 30 m as the maximum detection distance.

The scan mechanism 120 incorporates, for example, a motor (not illustrated) so as to rotate itself, and is mechanically coupled to at least a part of the laser range finder 110 so as to change the measurement direction (angle) of the distance by the laser range finder 110. For example, a configuration that rotates only the section of the optical system in the laser range finder 110 is possible. However, a configuration that rotates the whole laser range finder 110 and other configurations are also possible. The scan mechanism 120 rotates at a constant speed along a predetermined direction, and the measurement direction of the distance by the laser range finder 110 changes in conjunction with this rotation.

While the scan mechanism 120 changes the measurement direction, the laser range finder 110 periodically repeats the measurement. Accordingly, the distance-data acquiring unit 130 forms a detection area A100 as illustrated in FIG. 2, and acquires distance data in each direction at a predetermined angular interval within the detection area A100 per predetermined time in chronological order.

For example, assume that a scanning period T of the scan mechanism 120 is 50 ms (in which scanning is performed 20 times per 1 second) and a pulse laser beam is emitted in a range of 180 degrees corresponding to a half of one rotation to measure the distance. In the case where the pulse width of the pulse laser beam is 34 ns and the light-emitting period is 34.7 µs, the distance measurement can be performed 720 times within the range of 180 degrees. In this case, the angular interval of the distance measurement is 0.25 degree that is only about 13 cm as illustrated in FIG. 2 even 30 m away. Therefore, the spatial resolution within the detection area A100 is considerably high. This allows considerably accurately identifying the position, the size (width), the shape, and similar parameter of the detected object based on the distance data acquired by the distance-data acquiring unit 130, and determines, for example, whether or not the detected object is a human body. Even in the case where a plurality of human bodies is present within the detection area A100, this can individually identify these human bodies. This distance data can be obtained for each 50 ms of the scanning period T. The numerical values described here are merely examples.

In FIG. 2, the description has been given of the case where the laser range finder 110 is installed in the horizontal direction and the laser range finder 110 periodically repeats the measurement while the scan mechanism 120 changes the measurement direction parallel to the ground. The installation state is not limited to this. For example, the laser range finder 110 may be installed vertically downward or obliquely downward in a position at a certain height from the ground. In this case, simply storing information of this installation state, specifically, an installation height, a measurement direction, and similar information in the memory 160 allows calculating the height of the object by referring to these pieces of information.

The human-body determining unit 140 firstly analyzes the distance data acquired by the distance-data acquiring unit 130 to extract a portion estimated to correspond to a human body shape from the acquired distance data.

For example, as illustrated in FIG. 3, in the case where the human body 10 faces a direction to the laser scan sensor 100 side, a width W of the trunk part is about several tens of cm. Therefore, assuming that the width W is 40 cm, the width W corresponds to about three pieces of contiguous data at the distance of 30 m. When the distance becomes shorter, the width between the contiguous data becomes narrow correspondingly. For example, at a distance of 20 m, the width becomes about 8.8 cm. At a distance of 10 m, the width becomes about 4.4 cm. At this time, the number of portions of the contiguous data increases conversely regarding the same actual width. For example, at a distance of 10 m, a width of 40 cm corresponds to about nine pieces of the contiguous data. In the case where the human body does not face the direction to the laser scan sensor 100 side but faces obliquely or sideways, of course, the width appearing in the distance data becomes narrow.

Except a small child, the human body 10 is considered to have a height H that is ordinarily equal to or more than 1 m. In the case where the height of the detected object is lower than this height, there is a high possibility that a small animal that accidentally wanders into the area or the like is detected.

However, this describes only the human body 10 while walking ordinarily or standing. The situation is different, for example, in the case where the malicious person 10 invades by crawling. For example, as illustrated in FIG. 4(a) and FIG. 4(b), in the case where there is an intruder 10a crawling forward, the width W of the detected object approximately corresponds to the width of the human body while the height H of the detected object is assumed to be low at the same level of small animals. However, the intruder 10a is considered to take long time to invade. On the other hand, as illustrated in FIG. 5(a) and FIG. 5(b), in the case where there is an intruder 10b rolling in a lying posture, similarly, the height H of the detected object is low at the same level of small animals. However, the width W of the detected object is assumed to be much larger than an ordinary width of the human body. Unlike crawling forward, the intruder 10b might not take much time to invade.

The distance data is acquired in chronological order by the distance-data acquiring unit 130. Therefore, subsequently, a movement state of the portion determined to have a high possibility of the human body in the distance data is obtained so as to recognize how this portion changes in the subsequent distance data. Similarly, for example, in the case where the trajectory of the movement is significantly discontinuous, it is determined that there is a high possibility that the detected object is not a human body. Furthermore, taking into consideration the moving direction and similar parameter allows distinguishing, for example, between an intruder to watch out for and just a passerby walking near the border of the detection area A100. Putting the above-described determination and similar condition together, it is determined whether or not a human body to be watched out is present.

Even if an object is detected at a distance equal to or more than 30 m, the position of the object corresponds to the outside of the detection area A100. Therefore, this object is not treated as a target for determining whether or not the target is a human body as described above. This, however, should not be construed in a limiting sense.

The human-body determining unit 140 stores, for example, various information as necessary in the memory 160, and refers to, for example, the various information stored in the memory 160. The DIP switch 170 is disposed to allow external manual operation to select the time before the human-body determining unit 140 confirms the determination of the human body in the ordinary posture as necessary during the installation operation or similar situation.

The alert-output control unit 150 outputs an alert signal Dout1 in the case where the human-body determining unit 140 determines that a human body is present.

The distance-data acquiring unit 130, the human-body determining unit 140, the alert-output control unit 150, the memory 160, and the like are preferred to be configured by, for example, a one-chip microcomputer to be embedded in a device and software processing of this one-chip microcomputer. Each determination process described above and similar process can be realized by a method such as pattern matching. Therefore, a comparatively low-cost one-chip microcomputer can be employed. This contributes to cost reduction in overall laser scan sensor 100. However, the one-chip microcomputer is not necessarily used.

Outline of Human-Body Determination Process in Human-Body Determining Unit 140

Figure 6:
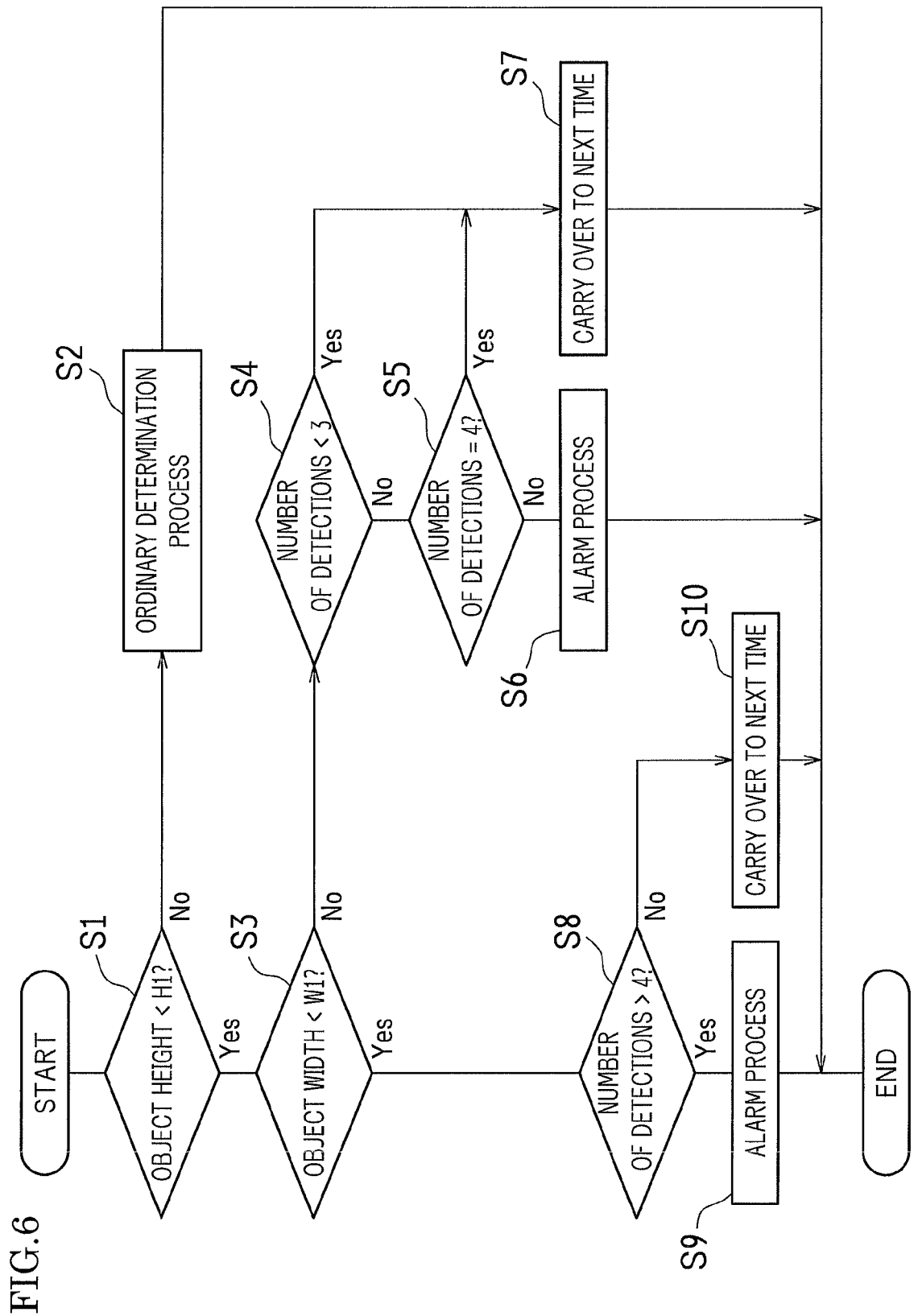
FIG. 6 is a flowchart illustrating an outline of a process for determining the presence of a human body at a human-body determining unit 140 of the laser scan sensor 100.

FIG. 6 is a flowchart illustrating an outline of the process for determining the presence of a human body at the human-body determining unit 140 of the laser scan sensor 100. Here, a threshold value related to the number of continuous detections described below is a value assuming that the scanning period T of the scan mechanism 120 is 50 ms. Obviously, the present invention is not limited to these numerical values.

Firstly, to change the specific content in the determination process based on whether or not the detected object is a human body while walking ordinarily or standing, the process compares the height H of the detected object to a predetermined height H1 (such as 1 m), which is a parameter set in advance (in step S1). In the case where the object height H is less than the predetermined height H1, the process proceeds to step S3 or otherwise proceeds to step S2.

In the case where the process proceeds from step S1 to step S2, the object height H is equal to or more than the predetermined height H1. Therefore, there is a high possibility that the detected object is a human body while walking ordinarily or standing. Thus, the process executes an ordinary determination process (step S2) and then terminates the human-body determination process. Here, this ordinary determination process can determine a human body even in the case where the time (which can be calculated from the product of the number of continuous detections and the scanning period T) while the object is continuously detected is comparatively short (for example, two or three times the setting of which can be changed by the DIP switch 170).

On the other hand, in the case where the process proceeds from step S1 to step S3, the object height H is less than the predetermined height H1. Therefore, the detected object may be a small animal for example. There is a possibility of, for example, invasion of the crawling malicious persons 10a and 10b. Accordingly, to distinguish these situations, the process compares the width W of the detected object to a predetermined width W1 (for example, 50 cm equivalent to a lateral width of the trunk), which is a parameter set in advance (in step S3). In the case where the object width W is less than the predetermined width W1, the process proceeds to step S8 or otherwise proceeds to step S4.

In the case where the process proceeds from step S3 to step S4, the object height H is less than the predetermined height H1 while the object width W is equal to or more than the predetermined width W1. Therefore, the detected object is unlikely to be a small animal or the like, but may be, for example, the rolling intruder 10b illustrated in FIG. 5(a) and FIG. 5(b). Here, it is confirmed whether the number of continuous detections of that object is less than three (in step S4). In the case where the number is less than three, confirmation for determining that this object is a human body is carried over to subsequent human-body determination processes (in step S7) and then the process terminates the human-body determination process. Otherwise, the process proceeds to step S5. In step S5, additionally, it is confirmed whether the number is equal to four. In the case where the number is equal to four, again, confirmation for determining that this object is a human body is carried over to subsequent human-body determination processes (in step S7) and then the process terminates the human-body determination process. Otherwise, the object is determined as a human body, and then an alarm process (in step S6) is performed. Subsequently, the process terminates the human-body determination process.

This step S5 is not necessarily an essential conditional branch. This is because, ideally, the determination is carried over to the next time in the case where the number of detections is one or two (in step S7), or the alarm process (in step S6) is always performed in the case where the number of detections is equal to or more than three. However, in the case where some trouble has occurred in the middle of the third determination and the process proceeds to the fourth determination without confirmation, the determination is carried over to the next time again (in step S7). When the process returns to the determination again (that is, when the number becomes equal to or more than five), it is determined that there is a high possibility that, for example, the rolling intruder 10b is present as assumed and then the alarm process is performed (in step S6).

On the other hand, in the case where the process proceeds from step S3 to step S8, the object height H is less than the predetermined height H1 and the object width W is less than the predetermined width W1. Therefore, for example, there may be a possibility of the intruder 10a crawling forward as illustrated in FIG. 4(a) and FIG. 4(b). Accordingly, it is confirmed whether the number of continuous detections of that object is larger than four (in step S8). In the case where the number is equal to or less than four, confirmation for determining that this object is a human body is carried over to subsequent human-body determination processes (in step S10) and then the process terminates the human-body determination process. Otherwise, the object is determined as a human body, and then an alarm process (in step S9) is performed. Subsequently, the process terminates the human-body determination process.

The above-described configuration of this embodiment keeps the detection performance with respect to the person 10 in the ordinary posture at the same level of the conventional techniques. Additionally, in the case where the height H of the detected object is low and there is a high possibility that the detected object is not a human body while walking ordinarily or standing, this configuration further takes into consideration the width W of the detected object so as to appropriately set each time before the determination that the detected object is a human body is confirmed.

This ensures the compatibility between prevention of false detection of a small animal or the like and reliable detection of the malicious persons 10a and 10b that invade by, for example, crawling as illustrated in FIG. 4(a) to FIG. 5(b), thus allowing appropriate operation that does not cause false alarm or alarm failure as much as possible. Additionally, this lengthens the time before the determination that the detected object is a human body is confirmed by the detection logic for a small animal or the like, thus improving false-alarm prevention performance against, for example, reflection by rain or the ground compared with the conventional techniques.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description. All modifications or changes that come within the meaning and range of equivalency of the claims are intended to be embraced therein.

This application claims priority on Japanese Patent Application No. 2011-198707 filed in Japan on Sep. 12, 2011, the entire content of which is incorporated herein by reference. Moreover, all documents cited in this specification are herein incorporated by reference.

DESCRIPTION OF REFERENCE SIGNS 10 human body (person)
10a intruder
10b intruder
100 laser scan sensor
A100 detection area
110 laser range finder
120 scan mechanism
130 distance-data acquiring unit
140 human-body determining unit
150 alert-output control unit
160 memory
170 DIP switch
H object height
H1 predetermined height
W object width
W1 predetermined width

The invention claimed is:

1. A laser scan sensor, comprising:
a laser range finder configured to measure a distance to an object based on a time after a laser beam emits before a reflected light returns from the object present in a direction of the emission;
a scanning mechanism unit configured to change a measurement direction of the laser range finder;
a distance-information acquiring unit configured to periodically perform measurement using the laser range finder while changing the measurement direction using the scanning mechanism unit, so as to form a detection area and acquire distance information for each direction within the detection area in chronological order;
a storage unit configured to store installation state information of the laser range finder;
a determining unit configured to:
detect an object with a possibility to correspond to a human body from the distance information acquired by the distance-information acquiring unit;
calculate a height and a width of the object based on the installation state information stored in the storage unit and obtain a calculated height and a calculated width;
determine that the object is a human body when detection of the object continues for a first predetermined time or longer in a case where the calculated object height is equal to or more than a predetermined height; and
determine that the object is a human body when detection of the object continues for a second predetermined time or longer in a case where the calculated object height is less than the predetermined height, the second predetermined time being longer than the first predetermined time; and
an alert-signal output unit configured to output an alert signal in a case where the determining unit determines that a human body is present.

2. The laser scan sensor according to claim 1, wherein the determining unit is configured to determine that the object is a human body when detection of the object continues for a third predetermined time or longer even in a case where the calculated object height is less than the predetermined height and the calculated object width is equal to or more than a predetermined width, the third predetermined time being equal to or shorter than the first predetermined time.

3. The laser scan sensor according to claim 1, wherein the installation state information stored in the storage unit includes at least an installation height and a measurement direction of the laser range finder.

4. The laser scan sensor according to claim 1, further comprising
a setting changing unit configured to change at least a setting of the first predetermined time by external operation.

5. The laser scan sensor according to claim 2, wherein the installation state information stored in the storage unit includes at least an installation height and a measurement direction of the laser range finder.

6. The laser scan sensor according to claim 2, further comprising
a setting changing unit configured to change at least a setting of the first predetermined time by external operation.

* * * * *